(12) United States Patent
Staiger

(10) Patent No.: US 6,292,718 B2
(45) Date of Patent: Sep. 18, 2001

(54) ELECTRONIC CONTROL SYSTEM

(75) Inventor: Dieter E. Staiger, Weil i. Schönbuch (DE)

(73) Assignees: International Business Machines Corp., Armonk, NY (US); Sony Electronics, Park Ridge, NJ (US)

( * ) Notice: Subject to any disclaimer, the term of this patent is extended or adjusted under 35 U.S.C. 154(b) by 0 days.

(21) Appl. No.: 09/443,658

(22) Filed: Nov. 19, 1999

(30) Foreign Application Priority Data

Jan. 28, 1999 (EP) .................................. 99101817

(51) Int. Cl.[7] ..................................... G06F 7/00

(52) U.S. Cl. ........................................ 701/1; 340/825.06

(58) Field of Search .................... 701/1, 36, 48, 701/29, 33, 2; 340/825.21, 825.06

(56) References Cited

U.S. PATENT DOCUMENTS

| | | | |
|---|---|---|---|
| 5,189,617 | * | 2/1993 | Shiraishi .................. 364/424.05 |
| 5,428,535 | * | 6/1995 | Katsumata et al. ......... 364/424.05 |
| 5,544,054 | * | 8/1996 | Kayano et al. ............. 364/424.01 |
| 5,699,250 | * | 12/1997 | Kobayashi ................ 364/424.058 |
| 6,052,632 | * | 4/2000 | Iihoshi et al. .................. 701/36 |

* cited by examiner

Primary Examiner—Tan Nguyen
Assistant Examiner—Dalena Tran
(74) Attorney, Agent, or Firm—McGuireWoods, LLP; Stephen C. Kaufman

(57) ABSTRACT

An electronic control system for controlling the function of a processing system is provided, especially for the use in an automotive vehicle, wherein said control system comprises a plurality of logical control elements, each of which is especially adapted to perform special tasks, whereby each of said control elements is able to communicate with every other control element.

23 Claims, 7 Drawing Sheets

ELECTRONIC CONTROL SYSTEM

FIELD OF INVENTION

The present invention relates to an electronic control system for controlling the function of a processing system. In particular the invention relates to such a control system that can be used in an automotive vehicle.

1. Background of the Invention

The appearence of electronically controlled vehicles controlled by so-called Electronic Control Units (ECUs) comprising a microcomputer has increased drastically in recent years. In addition to control of the rotational speed of the internal combustion engine, control of gear changeover in a transmission and control of a clutch, these vehicles also have various accessories controlled by the ECU. Based on signals from various sensors provided on a variety of actuators, which drive devices to be controlled, the ECU calculates control variables for the various actuators that are controlled and then outputs the corresponding signals to these actuators to control the operation of each device.

Control systems of this type are used, for example, in motor vehicles for performing control functions which are typically found in vehicles. In conventional systems, the control units are each specifically designed for one or several application functions. The implementation of a new vehicle function requires the design of a new respective control unit. Together with a new sensor and actuator configuration, this new control unit must then be installed in the vehicle.

Although the control units in modern configurations are networked, for example, via a CAN bus, no explicit interface exists for access to individual function components. As a result, the entire respective application function appears to the control unit. For implementing new so-called recombined functions, which are built from existing functions, the explicit interface must therefore be manually connected to existing functions, at a resulting high cost. This is accomplished, for example, by defining or changing corresponding CAN messages. Further disadvantageously, in order to add a single new function, this sometimes requires the changing of all of the other control units.

Together with the trend toward increasingly electronically implemented functions in motor vehicles and their increasing mutual coupling, a significant rise in complexity occurs, along with a corresponding difficulty in the development and mastery of the entire electronic system of the vehicle. Additionally, this leads to a rising demand for computing power and memory capacity. Moreover, as a result of the increasing complexity while there are simultaneously more and more series and shorter development times for these series, it is required that components should increasingly be capable of being used again in a series-spanning manner.

2. Description of Related Art

Electronic Control Units (ECU) using embedded controllers and processing systems typically display a distributed HW layout. This means, the system topology of the majority of the embedded ECUs,—and resulting functional HW layout and required components—is defined 'application specific'.

That means that standard processing system implementations as used in the majority of embedded systems, display a typical system architecture with a topology featuring a centralized processing unit (CPU) connected to the various subsystems defined by the target application of the overall system. The individual subsystems are build to support 'specialized' applications slices, all together performing the overall system target application(s).

Given these facts, implementations according to the ground rules of the typical standard System-Architecture will reflect in widely differing HW-realizations using individual HW assemblies for the various subsystem.

FIG. 1 shows a block diagram of such typical system layout, as used and implemented for a wide range of embedded systems to the state of the art. It can be seen, that ECU functionality is spread over the whole system, thereby creating redundancies and a lot of individual communication paths. Thus, the functions are not fault tolerant, because the connected parts present cannot be used to full advantage due to the actual topography. In addition, these systems are not cost efficient, because they need a hardware overhead to realize the respective functions. The multiple implementation of identical functionality on the diverse sub-systems— to mention 'power management' for example—is leading to increased physical size of the unit and as further negative consequences, is increasing the overall system power consumption and has a detrimental effect to the system reliability (a higher count of involved electronic parts is reducing the system MTBF).

Typical cooperating elements connected to the CPU, are units like: a Real Time Clock (RTC), power-up-reset and boot control circuits, system environmental sensors (for example temperature sensors, humidity sensor, etc.), and CPU independent system-watchdog functions and -timers.

Major functional application/solution areas are usually represented by entire sub-Systems:

Power-Subsystem (covering on ECU power devices as well as external, general power systems)

Storage sub-System (silicon storage devices and potential external mass storage devices like hard drives and optical devices)

Real-time sub-System(s) covering direct connected real-time devices (DIO) and covering real-time bus interfaces tying into external real-time devices Telematic sub-System(s) like radio transmitters and receivers, radar sensors, Modem and Phone and other devices allowing wireless communications and access to Wide Area Networks (WAN).

Human Interface System (or 'Man Machine Interface', MMI)—Mechanical I/O devices like switches, rotary knobs, joy-sticks; Graphical interfaces like simple indicators, alpha numeric displays, LCD displays etc.; Audio devices like undemanding signaling devices like beepers, horns or record players,—leading to complex voice control systems featuring voice recognition and voice output.

In addition to the domain-function of the respective sub-System, each of the indicated sub-Systems is typically covering functionality of power management, initialization routines, storage management, specific CPU and sub-System intercommunication and fault management— functionality covered redundantly—a fact given by the standard system architecture.

As a tribute to the distributed HW layout and the different individual internal sub-system solutions, there is no beneficial hardware/software (HW/SW) communality among the diverse ECU apparatus—even though following 'similar' standard architecture implementation.

A further consequence, the basic system control functions, the power management, the system support functions and system interface functions as well as the system internal specific communication links are repeatedly represented by identical hardware devices located on the sub-Systems, as well as integrated within the main CPU or supporting chip-set.

Characteristic to the standard HW-architecture and systems in consideration, is the entirely different nature of ECU-and corresponding sub-System intercommunication.

FIG. 1 is representative for a wide range of embedded systems, as for example, beginning with simple controllers likely used in consumer products like dish-washers, microwave ovens, washing machines,—reaching out to more complex systems as for example used the wide range of products covered by the world of 'pervasive computing', such as set-top boxes and multimedia devices. An entirely new playground of pervasive computing is invoked by the massive entry of multiple processing system into today's automobiles. Not only concentrating on vehicle domain functions, the processing platforms are used in extension to support new applications for client and remote server services. Already introduced and in the near future, modern vehicles will access external networks, allowing to provide services like remote diagnostics and maintenance, intelligent navigation using traffic information, facsimile mail, e-mail and last not least Internet access and services—were this list is not complete and will get extended dramatically in the upcoming years.

Remarkable to all systems pointed out is the fact, that the majority of applications served by the system-even though mainly executed by the individual sub-systems within the ECU, are loading the main CPU to some extend—or, in some cases significantly. To mention for example—all real-time functions as well as the non-real-time functions like the MMI caused routines and sub-system power management functions—are 'loading' the main CPU. In addition, the various ECU internal and system external communication links (like real-time bus induced interrupts, LAN and WAN connectivity), directly 'reporting' to the CPU are encounter demand for further CPU performance.

In consequence, the designer has to ensure sufficient processing performance (CPU MIPS)—oversized in comparison to the required MIPS rate defined by the system applications—to ensure proper system operation covering the most potential peak loads to expected.

FIG. 2 shows a system bus communication scheme typically used in a majority of processing systems (as for example Intel based Personal Computers). The bus structure is hierarchical oriented. The CPU local bus normally represents the bus, featuring the highest bandwidth performance. The CPU and closely related units and sub-systems are connected to this bus. A bus bridge is establishing the gateway to the next lower level bus system. In personal computing systems, this would typically be the PCI bus.

The benefits obtained by this architecture, is given by the simultaneous, undisturbed communication of units within their bus level.

However, all communications requiring units from the higher level bus (or vise versa) to access units located on other bus levels, will have to 'path' via the gateway provided by the respective bridge device.

The drawback of this bottleneck encountered by the standard bus structure is apparently, and needs not to be explained. A further disadvantage is given by the 'single usage in time' for this bus structure. For example, two bus participants communicating on one level, will obstruct not only the communication for other units located on this bus, further more, it is for this time unattainable for units located on an other bus levels to contact any unit on the former.

Dedicated SW and HW modules are used to allow extensive bus protocols, required to managing and to control the various communication types like M/S (Master/Slave) methods and DMA (Direct Memory Access) techniques.

In the Japanese Application No. 60-217471 there is disclosed a control system, wherein the electronically controlled vehicle described not only includes an ECU (main controlling unit) for controlling various actuators, it is also equipped with emergency actuators for back-up purposes in the event that any actuator or the main control unit itself develops an abnormality such as breakage of a wire or short circuit, and an emergency ECU for controlling the emergency actuators.

U.S Pat. No. 4,910,494 discloses an automotive vehicle control system including fault detection means provided in the main ECU for diagnosing faults in monitoring the emergency ECU.

In EP-A-0 862 296, there is described a data communication system comprising a plurality of ECUs used therein, each including a central processing unit for controlling an electronic device, and each of the ECUs communicating with other ECUs under a predetermined data transmission protocol.

SUMMARY OF THE INVENTION

It is therefore an object of the present invention to provide an electronic control system that allows to build up a highly efficient embedded processing system having high reliability and fault tolerance.

It is another object of the present invention to provide such a system that is advantageous in Processing Platforms requiring to perform real-time applications in coincidence with non-real-time applications.

It is still another object of the present invention to provide a control system architecture that is beneficial in a variety of pervasive computing applications.

These and other objects are achieved by providing an electronic control system for controlling the function of a processing system, comprising a plurality of logical control elements, each of which is especially adapted for carrying out special tasks, whereby each of said control elements is able to communicate with every other control element.

The present invention, called Tetrahedron Control Element Topology (TCET), describes a principle and system topology for processing/computing systems, advantageously enabling building Electronic Control Units (ECU) distinguished with prime system efficiency and system availability. The proposed system is comprises the attributes of providing basic fault tolerant behavior, supporting the efficient build of extensive fault tolerant systems, fault recovery, or fault fall-back mechanisms. The TCET principle maintains minimum system overhead, concerning hardware as well as software-resources, to provide basic fault tolerance. The principle utilizes the system HW resources to a maximized efficiency, thus being fundamental to allow system realizations at minimum cost.

The proposed architecture reduces the overall system components and subsystems to a core-set of four individual logical main control elements—organized in unique processing topology. Each one of the Control elements is individually defined to cover sharply outlined functional responsibilities—precondition for dedicated solutions, optimally solving the specified set of tasks. The Control elements cooperate in a unique intercommunication scheme, avoiding functional 'overlapping' HW-areas or SW modules within the overall system, as typically given by implementations utilizing standard system/subsystem architecture solutions.

An important key of the proposed idea is, to organize the identified control elements in a cooperating Tetrahedron geometry providing:

a) simultaneous multi-path communication the respective elements b) real-time capability to all ECU hardware near components, subsystems and networks c) secure access to system external units (located on LAN, WAN and wireless)

The TCET principle for the combined electronic circuit arrangement and software partitioning is allowing to build highly efficient embedded processing systems, featuring high system reliability and system processing availability. Efficiency by means of—in direct comparison to 'standard' processing system solutions—significantly reduced amount of electronics circuitry and system complexity, required to achieve the respective system target application(s). Furthermore, the principle delivers an optimal base structure supporting buildup of fault tolerant systems at minimum cost overhead.

TCET is profitably put in action for processing platforms required to perform real-time applications in coincidence with non-real-time applications.

Furthermore, this architecture is beneficial in a variety of pervasive computing applications.

In addition, this solution can be used with large scale computing systems, as well as with standard office computing systems, e.g., "personal Computers", very low end/low cost embedded systems and game computers. This list is exemplary only and not limiting.

DETAILED DESCRIPTION OF THE INVENTION

To reach the targeted attributes of the invention, it is essential to redefine the system topology and to find a new system organization and internal structure featuring reduced overlap and redundant functionality in the CPU and the corresponding sub-systems. As a leading guideline, each sub-system is to be defined to cover a specific, sharply outlined task spectrum. In this manner, it is possible to build optimized functional sub elements perfectly matching the requirements of the dedicated portion of tasks. To finally reach the objectives, it is indispensable to organize the sub elements in a topology allowing a highly effective intercommunication of the cooperating elements.

Three major maxims are used to lead to the proposed new ECU-principle and architecture.

(1) Reorganize the HW-Subsystems and Functional HW-elements and identify new logical elements concentrating on specific and interrelated tasks. At this stage it is important to understand, the logical elements are not necessarily to be represented by HW performing the tasks and applications in focus. The target is to avoid functional overlap of the newly defined logical elements—further called Control-Elements (C1 . . . Cn)—and to avoid redundant functionality spread out on the Control elements Cn.

(2) Define a new hardware and software system topology built upon the identified logical Control elements. Each Control element to be unique and to allow/support independent operating software by means of individual custom tailored Operating Systems, SW-Layers and drivers and specific Control element applications as appropriate.

(3) Define a Control element intercommunication scheme, providing the attributes efficient, secure and reliable for the communication ECU system internally as well as to all respective external communication links. The objective is, to avoid the drawbacks as known by standard architecture implementations (as described above). The communication path from any control element to any other control element to be invisible to the overall ECU application programs. As a ground rule, it is important to avoid specific, to task customized communication links interconnecting the individual control elements.

In addition to the ECU internal communication scheme, a secure solution allowing access to the ECU related real-time-networks and -subsystems as well as to communicate with system external extensions accessed by standard networks (LAN, WAN and wireless) has to be provided. Typical to this external network link is 'plug-and-play' capability and the potential for external users and systems to enter unauthorized.

Figure 1:
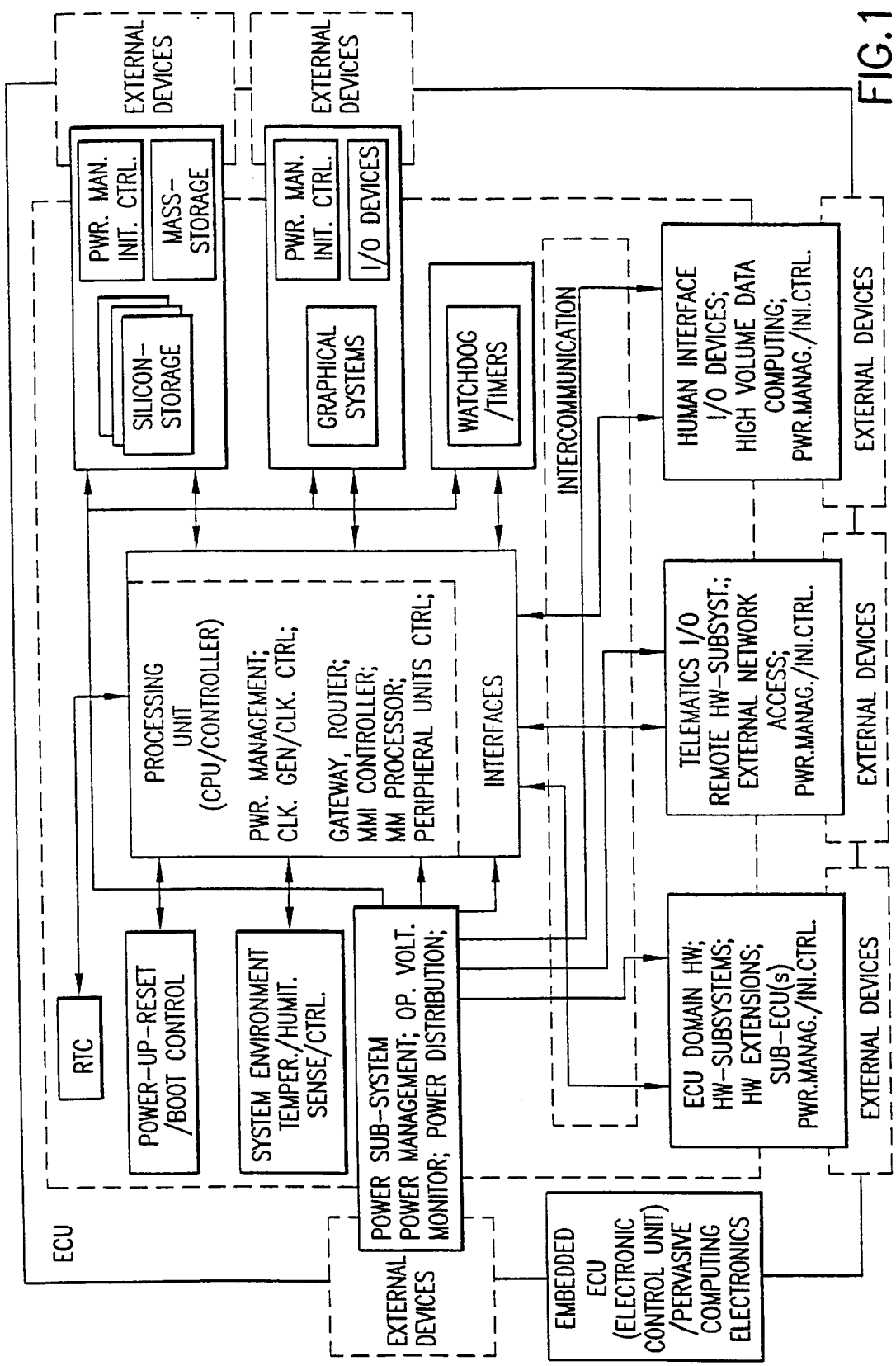
FIG. 1 is a block diagram showing a representation of a wide range of embedded systems.
Figure 2:
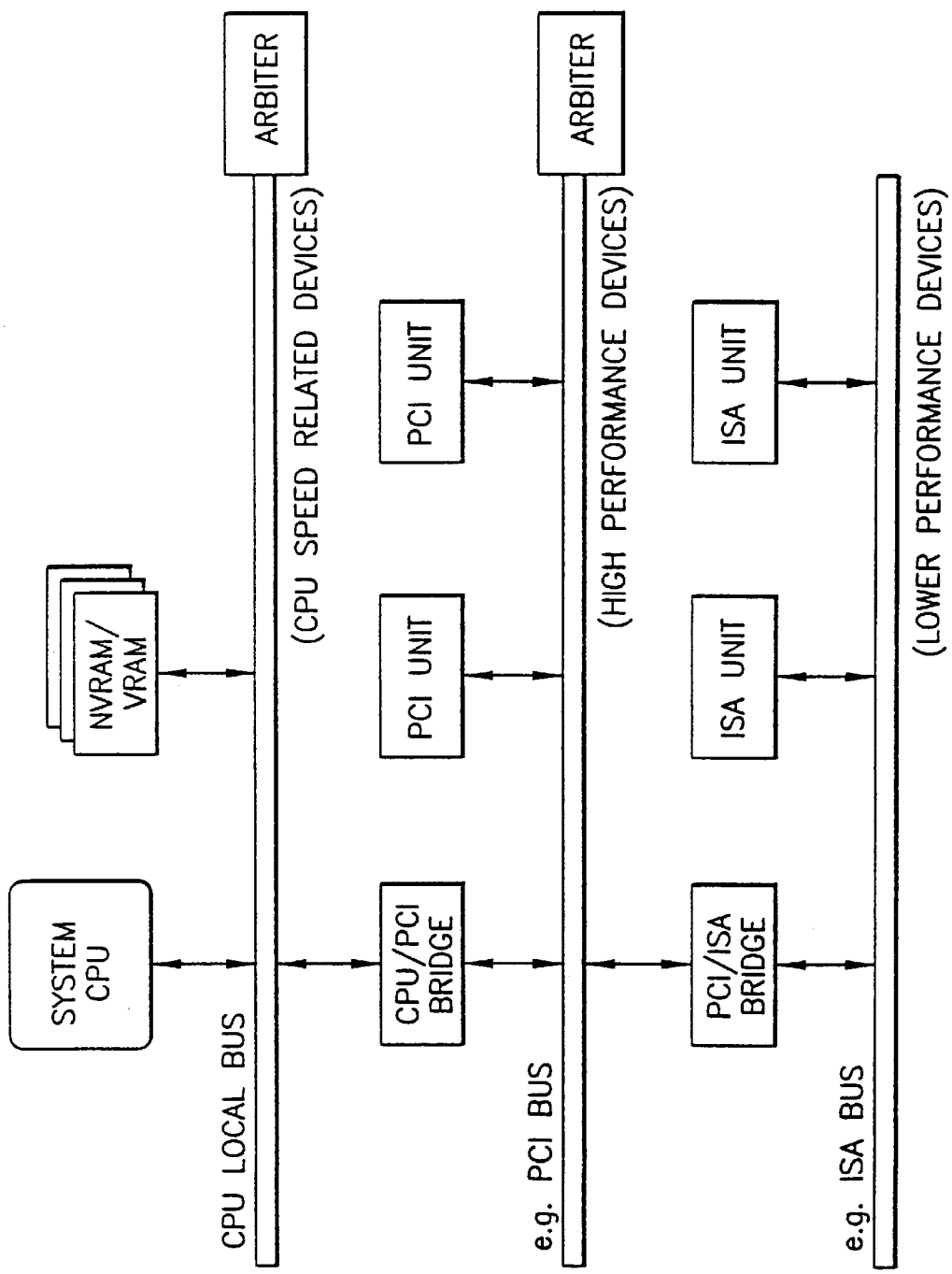
FIG. 2 is a block diagram of a system bus communication scheme used in processing systems such as personal computers.

The three maxims described above will now be explained in greater detail. Maxim 1: Identify Logical Control Elements $C_n$ FIG. 1 is used to analyze distributed functionality in a system implemented conform to standard system architecture and to define the new Control elements as demanded by maxim 1.

The first objective is to categorize functions and thereafter to assign directly related functions to on specific logical Control element. This concentrated collection of related and potentially directly communicating functions within one logical Control element will allow the definition of a highly effective solution.

A detailed examination of the 'standard system' uncovered a minimum set of four major functional areas. Each of one covers a specific field of applications and services. The base idea is to define individual, custom tailored Control-Elements (C1, C2, C3 and C4), providing exactly the functionality demanded by each area.

In the next step, the four areas identified, are defined as Control elements C1 to C4. At this point it is important to state, the identified Control elements define the logical functions assigned to the individual Control elements—and are not necessarily to be represented by hardware.

Functional Summary of the Control Elements C1 to C4

In the following, the functional tasks of each of the four control elements are given.

Control Element C1 'SysMon' (System-Monitor)
  Power management (shutdown unused power sources, control voltages)
  System power on control (power sequence, power good)
  System boot sequence generation and monitor (error monitor and fallback solution control)
  System vitality monitor (sense temperature, humidity, poll functional vitality indicators of the other control elements)
  System standby and sleep control
  System fault handling
Control Element C2 'ComPro' (Communication Processor)
  Real-time applications
  Real-time network access and control
  Gateway to the non-real-time sub-systems and networks
  System fault handling
Control Element C3 'MMI/A' (Man-Machine-Interface and general Application)
  Main ECU system applications
  Human interface applications and I/O functions (mechanical I/O, visual I/O, voice/audio I/O)
  Multi-Media applications (video and audio processing)
  System fault handling
Control Element C4 'CAP' (Common Access Point)
  Concentrated access point for system internal communication
  System expansion link to external communication
  System fault handling Maxim 2: Logical System Partitioning As per definition by the TCET principle, each control element is defined to operate independently and to execute its own specific field of applications. To adjust to the different nature of applications and to meet the system objectives as outlined, it is necessary to realize the control elements by using individual solutions, represented by hardware (HW) and/or software (SW), uniquely defined to best meet the specific requirements.

As already explained before, the logical control elements must not necessarily be represented by separate processors and/or hardware units. Depending on the overall system functionality, it is possible to realize the proposed TCET architecture by implementing the logical control elements on a single processor system as well. In this case, functional control elements can be solved by integrated HW-extensions, or even be replaced by SW-equivalents.

Concentrating on the identified individual spectrum of functionality for each Control element, will lead to a custom tailored solution, perfectly serving the specific field of operation. Redundant elements, as known by prior art, are kept to a minimum. The benefit for the overall TCET system features minimum resource overhead on hardware and software—an important fact to reach the overall system cost, performance and functional targets.

HW/SW implementation for typical embedded systems can be as follows:
Control Element C1 (SysMon)
  Hardware solution: A typical representation would be a low end 8 bit controller, or in certain occasions, a dedicated sequencer design integrated in an Application Specific Integrated Circuit (ASIC). An implementation, perfectly suiting the requirements for the majority of systems, could be, for example, a low end $\mu$Controller chip of the 'PIC' controller family supplied by Microchip.
  Operating System and Application Software: The preferred solution will not require an Operating System. The applications are programmed in lowest level HW language. This will lead to very compact and effective code directly executed by the HW. The SysMon algorithms, programmed in $\mu$-Code, are stored as 'firmware' in ROM or EERPOM, and are typically integrated on the SysMon component.
  Plain software implementation: The SysMon functions will be represented by SW modules executed by either C2 or C3. This solution would typically be chosen for very small embedded systems.
Control Element C2 (ComPro)
  Hardware solution: The emphasis for the ComPro is on minimum interrupt latency and minimum interrupt handler execution time. This is important for the hardware (micro controller and involved storage system) as well as the software executed by the SW (interrupt handler stack). Depending on the amount and complexity of real-time applications to be provided, the ComPro can be realized in the low-end by a dedicated programmable state machine, in the high-end by a standard 32 bit micro controller. For the majority of systems a 8 or 16 bit controller would be used.
  Operating System and Application Software: a) Real-time Operating System (RTOS) micro controller specific (for example OSEK, QNX and others) b) Low-end solution: Directly programmed real-time sequencer (in hardware or firmware).
  The operating system OSEK—an emerging standard in Europe—is used by the majority of vehicle manufactures. A very powerful OSEK implementation—developed by IBM and called AR/OS (Automotive Real-time Operating System)—is designed to exploit the PowerPC Architecture. AR/OS is configurable and comprises a full-featured real-time executive and a rich collection of optional libraries providing open network interfaces and extension supporting ANSI C and POSIX standards. The real-time executive provides the basic services defined in the draft POSIX real-time—meeting the needs of memory-constrained deeply embedded systems. The combination using a PowerPC microprocessor and AR/OS, will enable the ComPro to support a wide spectrum of applications.
  Plain software implementation: In TCET ECU implementations requiring
    a) very high performance to be provided for the control element C3 applications and
    b) only low demand on real-time functions and interfaces, it is meaningful to realize the ComPro functions in SW-modules executed by the C3 micro processor. In this type of realization, the C3 micro controller should provide an Memory Management Unit (MMU) allowing to separate the C2 code from the C3 code and applications. This is essential to allow the implementation of software models guaranteeing secure operation (separating the real-time world from the 'unsecured' plug-and-play systems potentially attached to the C3 element.
Control Element C3
  Hardware solution: C3 is the control element typically dealing with human interface components and multimedia units, shows the highest demand on processing performance (high MIPS rate) withing the TCET ECU. Interrupt latency and minimum interrupt handler execution time is normally uncritical. For this reason, the C3 is realized by standard 32-bit micro processors for the majority of systems. However, for low-end systems requiring only simple MMI support, a 16-bit or 8-bit micro controller solution may be sufficient.

Operating System and Application Software: The control element C3 is typically operated by standard Operating Systems (like for example QNX, WIN-CE and others) providing graphics support. In case of applications related to internet access and e-mail functions, a preferred solution can be a RTOS featuring a integrated JVM (Java Virtual Machine). In this solution, the C3 applications would be implemented in Java programs and applets.

Plain software implementation: Typically not applicable—however, very low end systems with only few human interface functions and higher focus on real-time-connectivity and applications, can be realized in by a more powerful C2 implementation, allowing exercise of the C3 software applications as well. For the same reason as explained for the plain software implementations explained for C2, the chosen micro controller for this type of logical C3 realization should provide a MMU.

Control Element C4

Hardware solution: The control element C4 is typically implemented in a hardware-only solution. In most cases a standard network controller can be used. In ASIC-solutions for the TCET ECU, a dedicated solution for C4 lead to the best and most cost effective implementation. For low-cost implementations, a Field Programmable Gate Array (FPGA), complementing smaller standard bus-controllers to build up the C4 functionality, can be meaningful.

Operating System and Application Software: As the C4 is typically a hardware-only solution, the C4 algorithms are provided by specific micro-programs executed by the hardware. The code implemented in firmware and is stored in ROM or EEPROM—normally integrated on the C4 device.

The C4 element does not provide any TCET ECU application function, and is for this reason 'invisible' to the system application software. The driver software potentially required for the network access, will be added to the respective operating systems used for C2 and/or C3.

Plain software implementation: This type of implementation would be 'considered' untypical TCET realization—however, it can be done if meaningful. The C4 functionality in these cases would be provided by SW-modules and hardware extension on either C2 or C3.

Maxim 3: Cooperative Operation of TCET Control Elements $C_n$

In general, it can be distinguished between two different types of communication of the TCET system and overall system environment. To begin with the TCET ECU internal communication, links allowing the Control elements C1 to C4 to communicate among each other have to be provided. The second type of communication considers all interaction links leading to the TCET ECU outer world.

In consequence to the TCET principle, as defined in Maxims 1 and 2, the diverse TCET ECU external communication links are assigned to the respective, to this type of communication specialized, Control element. This is an important fact leading to the object TCET attributes for system security and reliability—reasonable after understanding the specifics of the TCET 'outer links'.

The TCET 'outer links'

The connections to the real-time related world (FIG. 3, communication path i) is provided by the ComPro (C2). All applications, dealing with real-time functionality are executed by this control element.

Figure 3:
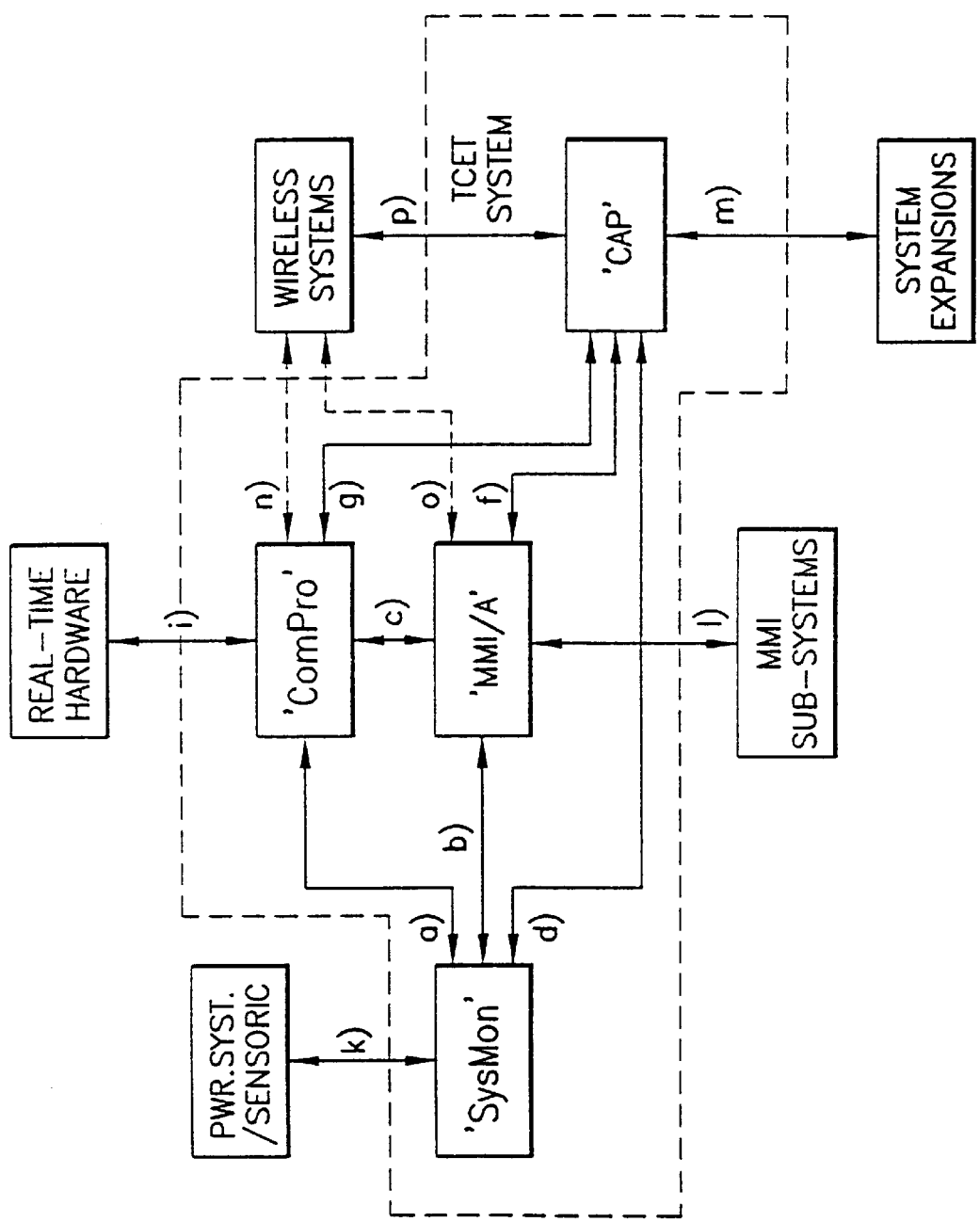
FIG. 3 is a block diagram showing TCET internal links.

The SysMon (C1) is connected to the external power sub-system and general system supporting devices (FIG. 3, path k). Both links, i) and k) deal with closely ECU related and hardware support functions. An example to illustrate the nature of this type of communication: in an automobile, this system is connected to safety relevant-and critical system functional-elements like the braking system, the transmission control, light control and others.

Tying into the so called 'unsecured' world, the CAP (C4) provides the communication link to system extensions and establishes access to LAN, WAN and wireless connectivity (FIG. 3, path m and p). 'Unsecured world' by means of networks, allowing the system user (e.g. vehicle driver or passenger) to plug in new devices ('plug-and-play', devices like a Personal Digital Assistant (PDA), CD-player, Modem and others) as well as providing entrance to far away systems, including access to Internet.

This separation, polarizing the real-time related applications on the ComPro and focusing the 'un-secured' plug-and-play world on the MMI/A (C3) and the CAP (C4) provides the perfect pre-condition supporting the implementation of secure gateways—thus, isolating the critical applications.

The TCET 'inner links'

The TCET internal links (FIG. 3, paths a, b, c, d, g and f) interconnect the control elements C1 to C4. All of this connections are used to support multiple types of communication task. One type of tasks, considering all internal links, can be summarized as 'system internal management and control' function. Typical internal management functions are: power management, boot control, system test and vitality check, and last not least, providing communication capability to support for fault tolerant strategies.

The communication link b) is mainly used to allow data exchange between the ComPro and the MMI/A control elements. Depending on the extend of applications to be executed by two mentioned Control elements, this link has to provide a transmission bandwidth beginning at 1 Mbps for typical systems, and in case of e.g. graphical information has to be exchanged, the demand on bandwidth may easily go up to as high as 20 or more Mbps.

The links d), f) and g) connect the control elements C1 to C3 to the CAP (C4)—thus allowing the access to the system ECU expansions. The bandwidth to be provided for these links is mainly defined by the external units to be connected, and is typically at least as high as the bandwidth required for path b).

As a guideline for the implementation of the TCET principle, it is advantageous to realize all TCET 'inner links' featuring identical performance and arbitration capability. This will provide multiple choices for the diverse communication types to be performed, thus leading to the objectives for high system availability and effectiveness. Further more, the multi-path link capability, supported and utilized by 'fault recovery' algorithms, optionally provided by C1 to C4, will represent a basic fault tolerant behavior and will enable effective implementations for further fault management.

The TCET ECU internal communication can further be classified to links staying ECU internally, by means of information exchange exclusively within the TCET elements, and by links being part of an wider communication path, leaving the ECU by external network. For further explanation, these links are labeled iL (immediate Link) for the internal links and aL (arbitrated Link) for the ECU external links.

Immediate Link (iL)

The control elements C1, C2 and C3 are interconnected by the links a, b and c. According to the TCET principle, these links are defined as bi-directional point-to-point connections. Each one of these links implies a maximum of two communicating participants.

As guideline for the implementation of the TCET principle, it is required to provide independent points of access on each end of the enumerated communication paths—regardless of overall system implementation model (HW and SW partitioning).

In case of a physical representation for a control element (HW solution), this would mean individual, independent transceiver devices for each link—in SW implementations respectively independent driver elements.

The realization for this type of communication path(s) is very simple—for both ways, SW and/or HW. Interrupt driven solutions are typically preferred, however, depending on the overall system implementation, polling techniques can be meaningful as well. Since only two points are to be addressed, higher demand for transmission speeds (for the typical bandwidth in focus) is not influencing the HW cost by significance.

Arbitrated Link (aL)

The communication paths d, f and g connect to the CAP (C4), and are via C4 enabled to tie into external networks. External networks can be represented by LAN and WAN—and for both network types, wireless connectivity is a valid implementation. Typically these external communication paths are represented as multi-drop networks, requiring arbitration, permitting to gain and to control bus access and communication rights.

For the ECUs in focus, such as in general embedded systems and pervasive computing devices, it is obvious to apply decentralized bus access schemes. Standard bus access techniques like CSMA/CA (Carrier Sense Multiple Access/Collision Avoidance) or CSMA/CD (Carrier Sense Multiple Access/Collision Detect) and related procedures represent the typically used bus access methods.

Depending on the field of TCET ECU application, transport capability for IP-frame based communication, asynchronous, synchronous and isochronous data transfer has to be established.

The following applies in generall to all TCET internal links:

For compatibility purpose and ease of implementation, the transport capability of IP frame based message exchange is preferred and advantageous for the majority of systems, requiring access to standard LAN, WAN and Internet,—valid for all TCET ECU internal links.

The TCET ECU links (summary of attributes, requirements and typical representation):

TCET system C1 . . . C4 internal communication
  a), b), d) SysMon task related communication requirement: low volume data, low speed
  c) Application driven communication/Firewall data exchange (i.e. IP-frames) requirement: medium to high volume data and speed
  g), f) communication to external expansion devices
  a) SysMon task related, (power management, vitality monitor, test) requirement: low volume data, low speed TCET system C1 . . . C4 external communication
  i) real-time 'near' HW communication (i.e. CAN, VAN networks) requirement: 10 Kbps to 1 Mbps, deterministic behavior
  k) SysMon/power-sub-system communication/power management (IIC bus, SPI, and others) requirement: low volume data, low speed (typ. 100 Kbps)
  l) MMI/Application sub-system communication (local devices) requirement: application dependant, graphic data I/O e.g. 10 Mbps
  m) system expansion bus (LAN; remote devices) requirement: application dependant, typically 10 . . . 100 Mbps (and more)

TCET Internal Communication Ground Rules

Using the following summarized ground rules as a guideline will lead to advantageous attributes for the implementations conform to the TCET principle. Nevertheless, depending on the requirements of a system to be developed, derivatives not following all points may have to be encountered. Understanding the tradeoffs and limitations, the TCET implementation will still provide its generic profitable attributes.

Individual access ports for each link to be provided for each control element
  No direct electrical coupling (or optical, in case of optical link) between the internal communication ports of a control element
  Individual SW driver modules for each link port for each control element
  Provide identical bandwidth for all TCET inner links (specified by the highest data rate required)
  Capability for simultaneous bi-directional communication for each inner link
  Provide asynchrony, synchrony and isochrony data transport characteristic
  Provide programmable message frame structure (e.g. support IP frame based message exchange)
  Provide programmable priority tables for all TCET communication types (preferable accessible by all control elements)—including a exceptional message routing/handling for e.g. emergency communication.

Detailed Description of Control Elements C1 to C4

Control Element C1 'SysMon' (System Monitor)

Figure 4:
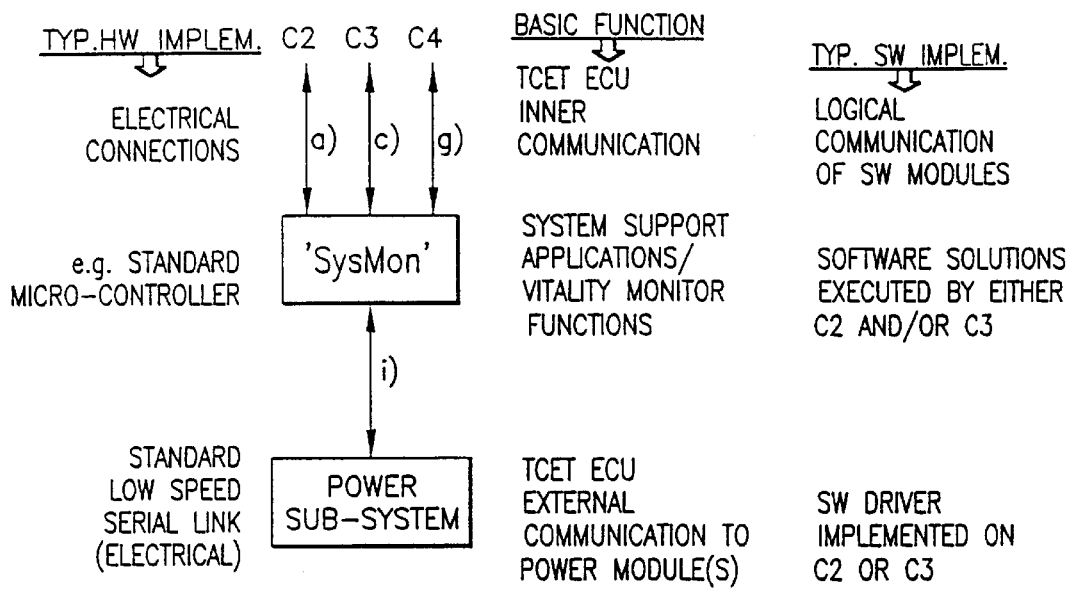
FIG. 4 is a block diagram showing the function of the control element C1 (SysMon)

FIG. 4 shows the function of control element C1 (SysMon).

The SysMon is assigned to the ECU internal functions and is an important component enabling the fault tolerant behavior of the overall system. Main duties are power-management, including sleep and wakeup control, watchdog-functions, and monitoring the vitality of the CSE system components. The communication link required to enable power management can be established by a slow speed standard SIO link to the Primary Power subsystem, such as for example SPI or I$^2$C.

Depending on the individually specified system requirements for fault recovery mechanisms, controlling the fault recovery elements may become the main task for the SysMon. The performance to be provided by this control element is defined to a wide extend by the implementation of this task.

The communication links connecting to the remaining control elements, as well as the algorithms for defining the fault behavior and fault recovery functions are, in accordance to the TCET architecture, advantageously implemented identically for all control elements.

As well as C2 and C3, the SysMon observes the 3-way internal/external communication links. It is enabled to automatically reorganize the ECU internal path of information transport upon faulty behavior.

Control Element C2 'ComPro' (Communication Processor)

Figure 5:
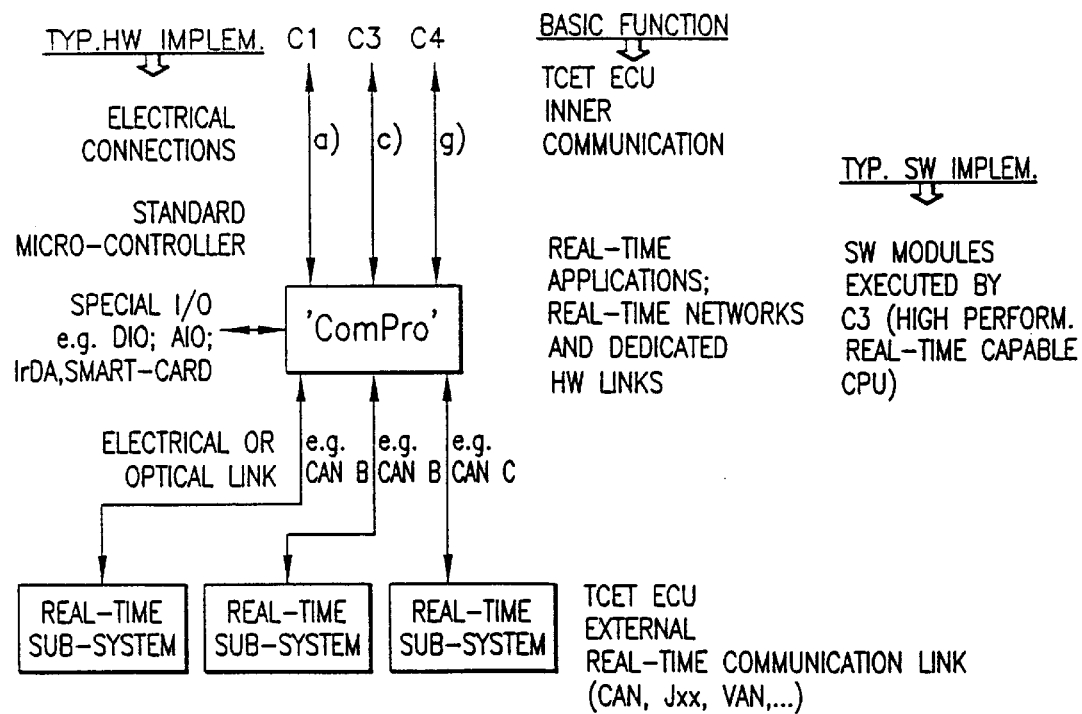
FIG. 5 is a block diagram showing the function of the control element C2 (ComPro)

FIG. 5 shows the function of the control element C2 (ComPro).

The key job assignment for the ComPro is dealing with all real-time applications of the TCET ECU. For this reason, the ComPro is the central communication element, connected to all TCET-ECU internal and ECU extending real-time networks. In addition to this, the TCET-ECU connects to 'closely related' hardware units. These type of devices are supported by special I/O ports like: digital I/O (DIO), analog I/O (AIO), infrared communication links (IrDA), Smart-Card and other interfaces. Some of this functionality, if not strong real-time concerned, can also be provided by the control element C3—thus still conforming to the TCET architecture.

The concentrated access to all real-time networks going along with the communication possibility within this control element makes the ComPro 'the element of choice' to provide bridging, routing and gateway functionality. In this applications scenario, the ComPro can be built to support complex message filtering and message morphing—thus taking significant processing strain from the control element C4.

Furthermore, provided by the TCET internal communication architecture, the ComPro has access to all additional communication paths like multi-media links and all types of LAN and WAN connectivity.

Typical representatives for the real-time links are field-busses like CAN, J1939, VAN and others. The hardware solution for the ComPro has to provide real-time capable electronics with focus on minimum interrupt latency and high speed interrupt handling support. The importance for general processing performance is of secondary nature.

Connecting to e.g. three individual CAN networks, and in addition tying into sub-control element feature-links and feature-I/Os, may cause interrupt rates of more than 15000 interrupts/second to be handled by the ComPro processing system.

The communication link sub-System and the fault behavior algorithms and functions are, in accordance to the TCET architecture, advantageously implemented identically for all control elements.

As well as C2 and C3, the SysMon is observing the 3-way internal/external communication links. It is enabled to automatically reorganize the ECU internal path of information transport upon faulty behavior.

Control Element C3 'MMI/A' (Man-Machine Interface/Application)

Figure 6:
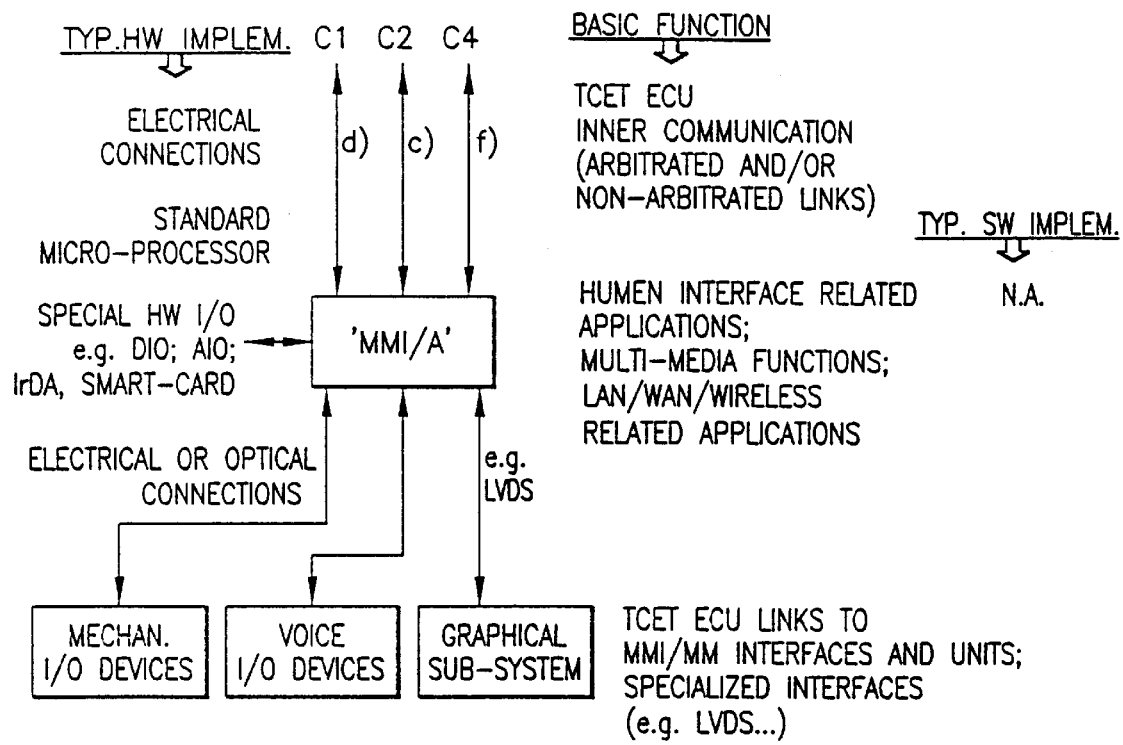
FIG. 6 is a block diagram showing the function of the control element C3 (MMI/A)

The function of control element C3 is shown in FIG. 6.

The control element C3 covers the most demanding TCET ECU system applications. In addition, the human interface operations and going along I/O support are significant functions to be performed by this element. The MMI interfaces cover mechanical I/Os (like sensors and actors), visual I/O (like cameras and displays), and last not least voice/audio I/O (like microphones and speaker devices). The concentrated collection of these type of I/O devices distinguishes the MMI/A as the predominant element to perform the increasing range of Multi-Media applications and Telematics applications, including video and audio processing.

Future MMI systems, even more than Multi-Media and Telematics Systems demand very high computing performance: Displaying three-dimensionally, and being visible ergonomically in the dynamic light situations as for example occurring in vehicles in motion, enforces very high 2D/3D graphical performance. Especially new I/O devices, like innovative 'one-hand' operating controls, automotive equitable 'tolerant' touch screen overlays, or 'hands-free' devices using voice recognition and speech synthesis, are defining the demand for high computing power for this control element.

Typically 300 MIPS have to be provided for standard MMI/MM systems are foreseen already today. The lowest limit for 'highly cost constrained entry-systems' is estimated to 100 MIPS.

Numerous processors on the market are capable to satisfy the computing power demand. However, system cost restrictions in the embedded world, and high reliability as for example required by ECUs used in automobiles, are reducing the number of choices significantly.

The communication link sub-System and the fault behavior algorithms and functions are, in accordance to the TCET architecture, advantageously implemented identically for all control elements.

As well as C2 and C3, the SysMon observes the 3-way internal/external communication links. It is enabled to automatically reorganize the ECU internal path of information transport upon faulty behavior.

Control Element C4 'CAP' (Common Access Point)

Figure 7:
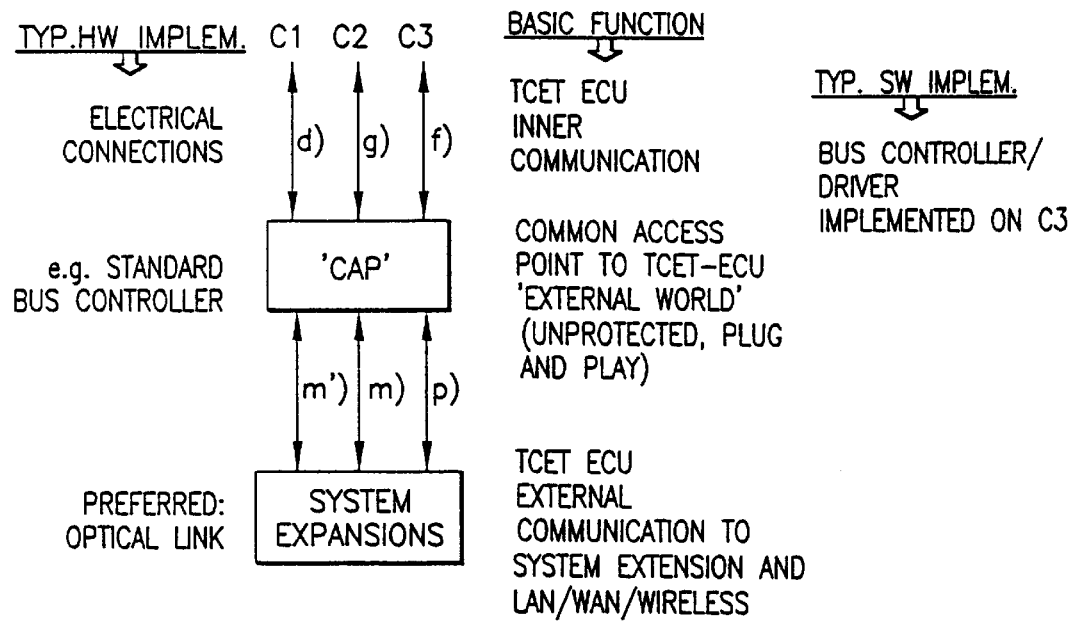
FIG. 7 is a block diagram showing the function of the control element C4 (CAP)

FIG. 7 shows the function of control element C4.

The control element C4 concentrates the communication links connecting the inner ECU world with the outside. Acting as the Common Access Point, the CAP is the only point external systems are enabled to enter and to communicate with the TCET ECU. This single point of access, allowing external 'unprotected' devices to communicate with the TCET ECU, is an important feature of the proposed architecture, supporting to build fault tolerant systems and, in conjunction with the task-assignment as described for C2 and C3, cost effective secure gateways. The collaboration of all control elements is the key to the advantageous attributes of the TCET principle.

Three communication ports d), g) and f) are provided at the primary side of the CAP, establishing the communication links to the ECU internal control elements. The internal communication ports are preferably mutually electrically isolated by individual physical transceiver devices, connecting to the other TCET control elements.

The secondary communication port m) connects the TCET ECU via LAN and/or WAN to the 'outer world'. The communication path m) is typically enabled for 'plug and play' operation, to allow the system-user or operator to add on new, system-function expanding devices. For fault tolerant reasons, this port can be represented by a plurality of physical transceiver devises.

The external networks (LAN, WAN) are usually multi-drop networks, requiring C4 to provide arbitration capability, to obtain bus rights for C1/C2/C3-communication to the external net.

The CAP isolates the external units from the 'inner CSE' elements. From a SW-perspective, the CAP function is comparable with a repeater, and is therefore invisible.

TCET solution—Summary to Theory of Operation

In following the maxims, as explained above, individual, custom tailored logical control elements are determined, defined to exactly provide the functionality demanded by each application/task area.

Depending on the target system requirements, the control elements C1, C2 and C3 form the core system functionality. These Elements are typically represented by dedicated, individual processors and/or specific hardware elements and/or software modules. Control element C4 is functioning as Common Access Point (CAP). C4 is connected to all TCET ECU internal Control elements on the internal (primary) side, and provides communication links to ECU external systems and expansion units on the secondary side. In this instantiation, Control element C4 concentrates the entire external system communication—implying the potentially 'unsecured plug-and-play' world and Internet connectivity hazards—on this single point of access.

Figure 8:
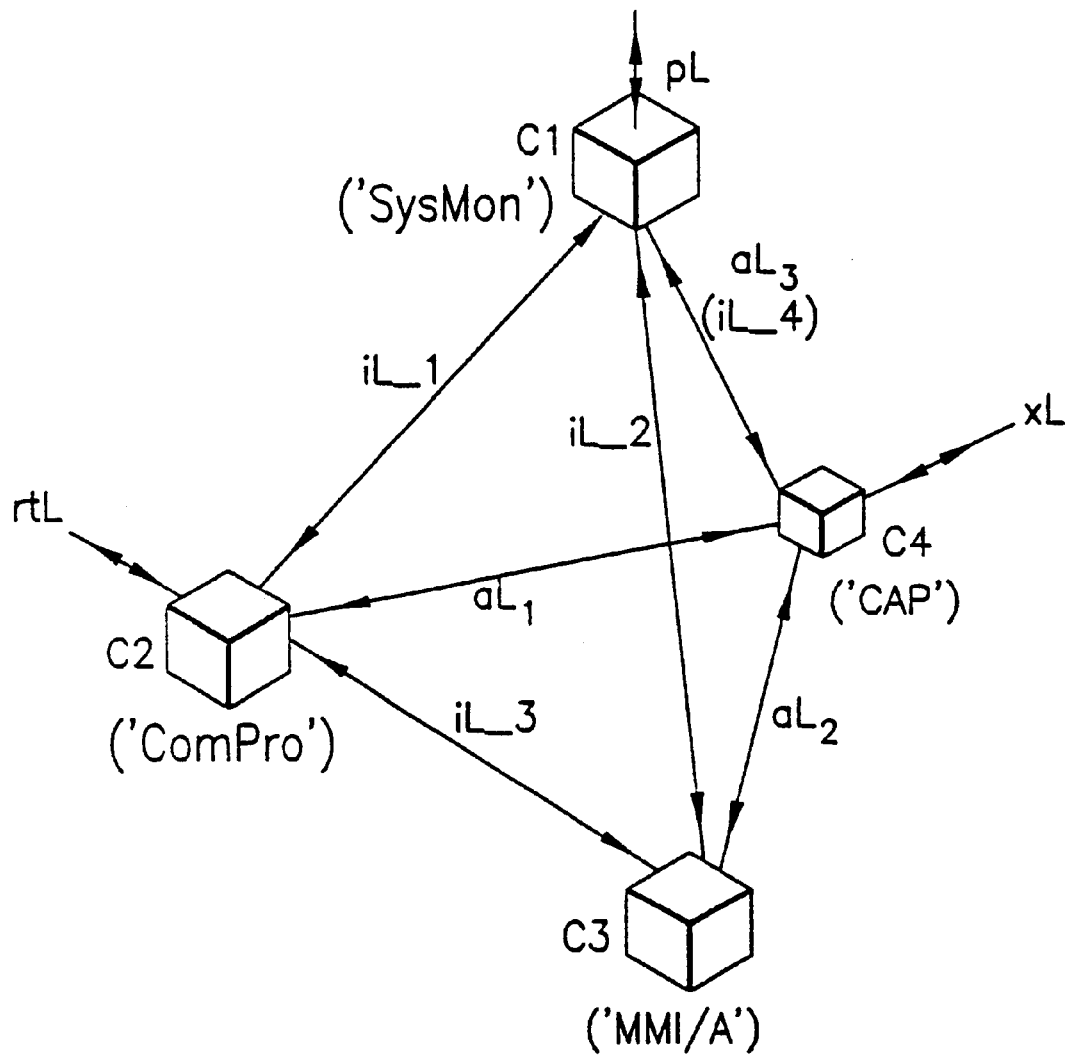
FIG. 8 is a block diagram showing a summary of the four main control elements C1–C4.

FIG. 8 displays a summary to the four main Control elements C1 to C4 for the logical representation and the physical instantiation of the specific tasks to be provided. The SysMon (C1), the ComPro (C2) and the MMI/A (C3), providing the general ECU functionality, are organized in a communicating triangle. Each one is individually connected to the respective two neighbour control elements.

Establishing the ECU external connectivity, an individual communication link provided for each, C1, C2 and C3, connects the TCET internal elements via the CAP (C4) to the outer world—thus building up an inter-linked control element system, forming the geometric of a Tetrahedron.

This structure is essential to the advantageous attributes of the TCET principle. The system architecture concentrate related tasks and applications on specific, optimized control elements. This statement is an important key, allowing to build cost effective, highly efficient systems, avoiding functional overhead, leading to redundant code and circuitry. Furthermore, the TCET organization for the ECU internal and external communication is essential supporting to build high performance systems. The TCET topology provides simultaneous multi-path link capability, thus overcoming communication bottlenecks and providing basic fault recovery potential.

In addition, this system topology is a fundamental prerequisite supporting implementation variants, featuring fault tolerant system behavior on demand.

System Fault Handling

The control element C1 (SysMon) in general monitors the system vitality and controls the system fault fall back behavior. The TCET system architecture presents an ideal precondition, allowing to implement comprehensive fault fall-back behavior logistics. Already furnished with a fault tolerant communication structure, the overall system fault behavior can be extended very effectively.

To a wide extent, this can be achieved, by adding, potentially small, 'system fault handling' test routines and fault recovery routines to each control element, allowing implementation a very effective system fault recovery strategy.

Techniques like adding on redundant elements and subsystem, as most commonly used in standard systems implementations, are certainly supported by the TCET principle as well. In this type of fault tolerant implementations, the TCET topology is still advantageous for cost effective realizations.

An example scenario, outlining a basic fault tolerant TCET implementation is as follows:

The communication path iL_3, connecting the ComPro with the MMI/A is for any reason disrupted or obstructed for a period of time.

To overcome this system-fail situation, an algorithm can be defined, automatically utilizing alternative communication paths, provided by the TCET principle. This consequent rerouting will be initiated automatically in the background, thus invisible to the basic application executed in this moment of time by the ComPro and MMI/A.

The alternative communications paths for this example are:

(1) iL_1-iL_2 or (2) iL_1-3 aL3-aL2

In this type of implementation, it is most effective to realize the logistic for these routines identically for all involved control elements.

The key advantages are a highly cost efficient system framework supporting and enabling Cost advantage by reduced amount of overall hardware components Reduced physical size Minimized power consumption Basic fault tolerant system structure as precondition supporting the implementation and fault recovery mechanisms High overall system efficiency by reduced 'uncoordinated' system redundancy High system availability—no typical system bus bottleneck is blocking the system High system reliability Perfect hardware prerequisite supporting 'Firewall' implementations In general, the TCET architecture can be used in the following listed applications as well, however since representing a new type of system architecture, the system is not immediately compatible to de-facto-standards as known for example in today's personal computer scenario. In consequence, existing Operating Systems and applications (Software) would have to be ported and translated:

Large scale computing systems

Standard office computing systems (e.g. 'Personal Computer')

Very low end/low cost embedded systems

Game computers

Figure 9:
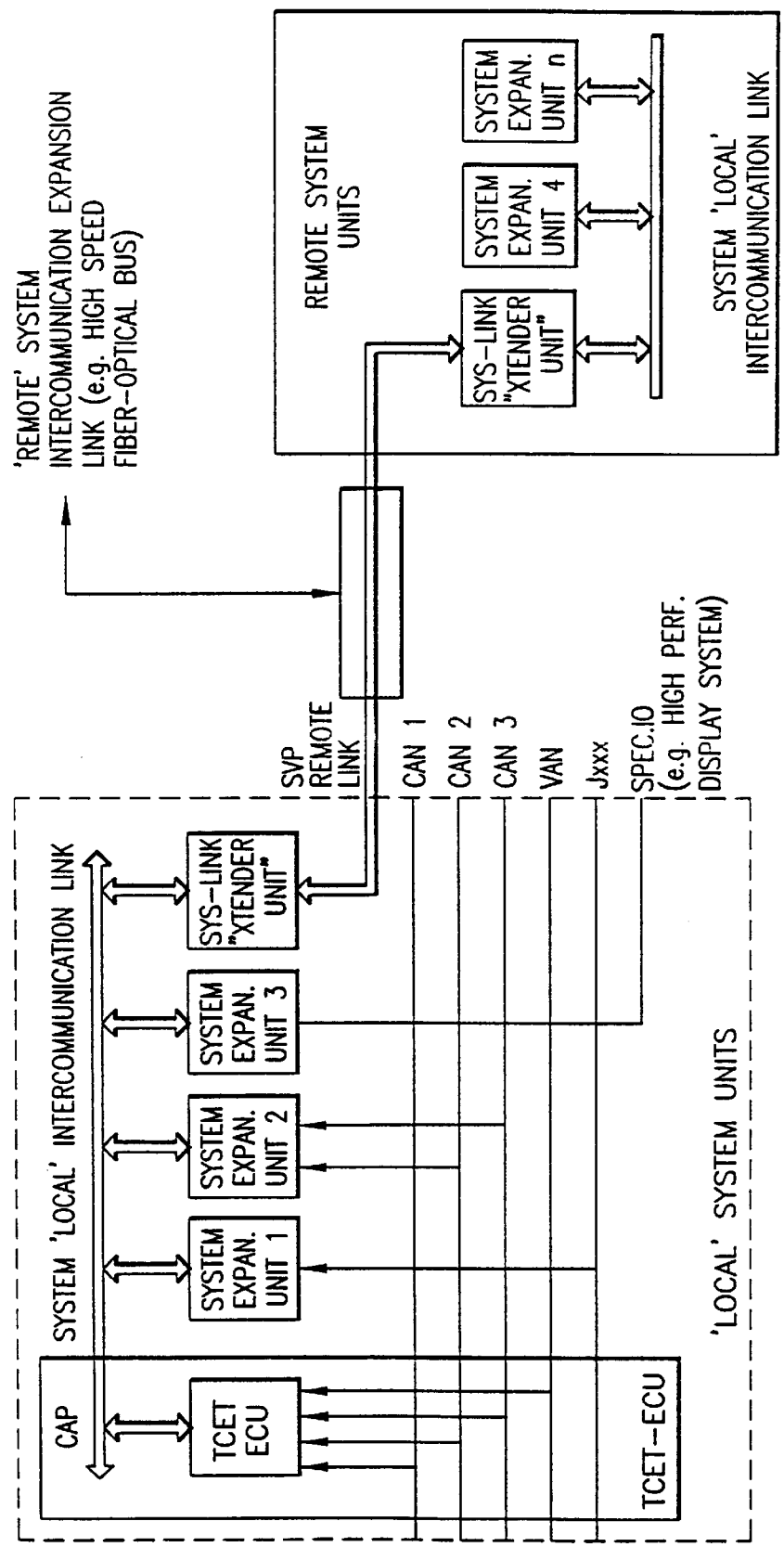
FIG. 9 is a block diagram showing an example of an overall electronics system as realized in high-end automobiles.

FIG. 9 shows, as an example, an overall electronics system as typically realized in today's high-end automobiles. The block diagram displays an TCET ECU networked/corresponding width eight external ECUs.

The applications provided by this example system are Human-interface functions, Multimedia support, as well as vehicle domain functionality like cabin control functions (light control, climate control, engine and braking system monitor and others).

The TCET ECU, labeled as Core ECU, is typically providing the main processing functionality within this system scenario, according.

On the real-time access ports, the TCET ECU is connecting (via ComPro, C2) to the vehicle real-time networks, like CAN_1 (e.g. cabin network), CAN_2 (e.g. diagnostic network), CAN_3 (e.g. motor network) and other busses. The information gathered and controlled by this networks is for example engine temperature, oil pressure, brake light is failing and others provided by HW near ECU units.

On the 'unprotected' side, the TCET ECU is accessing the system intercommunication link via CAP (C4). In this example, this link is distinguished by two areas. The 'local units' area is interconnecting ECUs in direct physical neighborhood of the Core-ECU. For cost reason, this type of network is uses low cost copper media. The units 1 to 3 are for example: displays, radio system or a telephone.

By the 'sys-link Xtender' unit, this local system extends connecting to remote system units (like CD-ROM player or other for example located in the trunk of the vehicle). The network media connecting the local and the remote units would typically be an optical link.

What is claimed is:

1. Electronic control system for controlling the function of a processing system, especially in an automotive vehicle, characterized in that said electronic control system comprises four main logical control elements, each of which is especially adapted to perform special tasks, whereby each of said control elements is able to communicate with every other control element, wherein said control elements are arranged in a tetrahedron geometry.

2. Electronic control system as in claim 1, wherein one of the logic control elements functions as a common access point.

3. Control system as in claim 1, wherein said control elements are represented by individual processors.

4. Control system as in claim 1, wherein said control elements are represented by specific hardware elements, namely standard $\mu$-Controllers, programmable or firmware-controlled State-Machines and Sequencers or combinatorial asynchronuous or sequential Boolean logic circuits.

5. Control system as in claim 1, wherein said control elements are represented by a single CPU.

6. Control system as in claim 1, wherein said control elements are represented by software.

7. Control system as in claim 1, wherein a first control element represents the specific functionality of system support applications, a second control element covers all applications related with real-time networks and direct hardware controls, a third control element exercises all human interface applications and the electronic control system specific functionalities, and a fourth control element functions as a network access point connecting to electronic control system-external extension units and to local area networks (LAN) or wide area networks (WAN).

8. Control system as in claim 7, wherein the system support applications are chosen from the group consisting of power management, wake-up and sleep control, system vitality monitor and system fault handling.

9. Control system as in claim 7, wherein the direct hardware is chosen from the group consisting of motors, relays and other real-time electronic control systems.

10. Control system as in claim 7, wherein the human interface applications are chosen from the group consisting of physical iniput/output units, visual input/output units and voice input/output units.

11. Electronic control system for controlling the function of a processing system, especially in an automotive vehicle, said system comprising a plurality of main logical control elements, each of which is especially adapted to perform special tasks, whereby each of said control elements is able to communicate with every other control element, wherein three of said control elements comprising intermediate link ports and one arbitrated link port, connected with the control element functioning as a common access point.

12. Control system as in claim 11, wherein the link ports preferably use identical data link protocol and/or the physically representation thereof.

13. Control system as in claim 11, wherein the arbitrated link uses the standard bus access technique Collision Sense Multiple Access (CSMA).

14. An electronic control system for controlling a processing system, comprising:

a plurality of control elements, each of which performs a predetermined function and each of which is able to communicate with remaining ones of said control elements, wherein said control elements are arranged in a tetrahedron geometry.

15. An electronic control system as in claim 14, wherein said control elements are implemented in software.

16. An electronic control system as in claim 14, wherein said control elements are implemented in hardware.

17. An electronic control system as in claim 14, wherein said tetrahedron geometry provides simultaneous multi-path communication among said control elements.

18. An electronic control system as in claim 14, wherein said tetrahedron geometry provides real-time capability to electronic control unit (ECU) hardware near components, sub-systems, and networks.

19. An electronic control system as in claim 14, wherein said tetrahedron geometry provides secure access to system external units via at least one of a network and wireless connection.

20. An electronic control system as in claim 14, wherein said plurality of control elements equals four, and wherein a first one of said control elements performs a function of system monitor, a second one of said control elements performs a function of communication processor, a third one of said control elements performs a function of man-machine interface and general applications, and a fourth one of said control elements performs a function of a common access point for external communications.

21. An electronic control system as in claim 20, wherein each of said four control elements operate independently of one another to perform respective ones of said predetermined functions, and wherein said four control elements performs said respective predetermined functions in cooperation with one another for controlling said processing system.

22. An electronic control system as in claim 20, wherein each of said four control elements may be implemented in one of software, hardware, and a combination of software and hardware.

23. An electronic control system as in claim 14, wherein said processing system is an automotive control system.

* * * * *

UNITED STATES PATENT AND TRADEMARK OFFICE
CERTIFICATE OF CORRECTION

PATENT NO. : 6,292,718 B2
DATED : September 18, 2001
INVENTOR(S) : Staiger

It is certified that error appears in the above-identified patent and that said Letters Patent is hereby corrected as shown below:

Column 4,
Line 47, delete "is";

Column 6,
Line 47, change "on" to -- a --;

Column 9,
Line 32, change "lead" to -- leads --;

Column 10,
Line 37, change "tasks" to -- task --;

Column 13,
Lines 15 and 63, change "type" to -- types --;

Column 14,
Line 54, change "devises" to -- devices --;

Column 15,
Lines 53-54, change "sub-system" to -- sub-systems --;

Column 16,
Line 64, delete "is".

Signed and Sealed this

Second Day of April, 2002

Attest:

*Attesting Officer*

JAMES E. ROGAN
*Director of the United States Patent and Trademark Office*